(12) United States Patent
Woo et al.

(10) Patent No.: US 10,793,714 B2
(45) Date of Patent: Oct. 6, 2020

(54) POLYCARBONATE RESIN COMPOSITION AND MOLDED PRODUCT USING SAME

(71) Applicant: LOTTE ADVANCED MATERIALS CO., LTD., Yeosu-si (KR)

(72) Inventors: Eun Taek Woo, Uiwang-si (KR); Yoo Jin Jung, Uiwang-si (KR); Eric Arifin, Uiwang-si (KR); Jung Ki Kim, Uiwang-si (KR); Na Ri Park, Uiwang-si (KR); Mi Rae Jang, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 20 days.

(21) Appl. No.: 15/570,420

(22) PCT Filed: Apr. 28, 2016

(86) PCT No.: PCT/KR2016/004443
§ 371 (c)(1),
(2) Date: Oct. 30, 2017

(87) PCT Pub. No.: WO2016/175572
PCT Pub. Date: Nov. 3, 2016

(65) Prior Publication Data
US 2018/0171137 A1 Jun. 21, 2018

(30) Foreign Application Priority Data

Apr. 30, 2015 (KR) ........................ 10-2015-0061403

(51) Int. Cl.
| C08L 69/00 | (2006.01) |
| C08K 3/10 | (2018.01) |
| C08L 67/00 | (2006.01) |
| C08K 3/22 | (2006.01) |

(52) U.S. Cl.
CPC ............... *C08L 69/00* (2013.01); *C08K 3/10* (2013.01); *C08L 67/00* (2013.01); *C08K 2003/222* (2013.01); *C08K 2003/2227* (2013.01); *C08K 2003/2231* (2013.01); *C08K 2003/2248* (2013.01); *C08K 2003/2251* (2013.01); *C08K 2003/2286* (2013.01); *C08K 2003/2296* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| 8,309,640 | B2 | 11/2012 | Li et al. |
| 8,865,821 | B2 | 10/2014 | Stoppelmann et al. |
| 8,933,161 | B2 | 1/2015 | Takano et al. |
| 9,534,115 | B2 | 1/2017 | Nii |
| 9,815,968 | B2 | 11/2017 | Stoppelmann et al. |
| 9,969,877 | B2 | 5/2018 | Kikuchi et al. |
| 2005/0137360 | A1 | 6/2005 | Shaikh et al. |
| 2009/0239975 | A1 | 9/2009 | Jung et al. |
| 2012/0165425 | A1 | 6/2012 | Park et al. |
| 2013/0168133 | A1 | 7/2013 | Schrauwen |
| 2014/0159285 | A1 | 6/2014 | Choi |
| 2014/0275372 | A1* | 9/2014 | He .......................... C08L 69/00 524/265 |
| 2014/0296411 | A1* | 10/2014 | Cheng ...................... C08K 3/22 524/413 |
| 2015/0232661 | A1 | 8/2015 | Wang et al. |
| 2017/0361584 | A1* | 12/2017 | Feng ....................... B32B 27/08 |

FOREIGN PATENT DOCUMENTS

| CN | 1891755 A | 1/2007 |
| CN | 101104731 A | 1/2008 |
| CN | 101583669 A | 11/2009 |
| CN | 103154135 A | 6/2013 |
| CN | 103289342 A | 9/2013 |
| CN | 103665831 A | 3/2014 |
| CN | 106068294 A | 11/2016 |
| KR | 10-2011-0018319 A | 2/2011 |
| KR | 10-2012-0073818 A | 7/2012 |
| KR | 10-2012-0124167 A | 11/2012 |
| KR | 10-2013-0056306 A | 5/2013 |
| WO | 2013/161433 A1 | 10/2013 |
| WO | 2014/162254 A1 | 10/2014 |
| WO | 2015/005111 A1 | 1/2015 |
| WO | 2016/175572 A1 | 11/2016 |

OTHER PUBLICATIONS

International Search Report in counterpart International Application No. PCT/KR2016/004443 dated Jul. 29, 2016, pp. 1-4.
Nan et al., "Rheological and Failure Properties of Polycarbonate/Poly(Butylene Terephthalate) Blends", Polymer (Korea), 2007, vol. 31, No. 5, pp. 399-403.
Office Action in counterpart Chinese Application No. 201680024684.6 dated Feb. 22, 2019, pp. 1-5.
Office Action in counterpart Chinese Application No. 201680024684.6 dated Mar. 16, 2020, pp. 1-12.

* cited by examiner

*Primary Examiner* — Robert T Butcher
(74) *Attorney, Agent, or Firm* — Additon, Higgins & Pendleton, P.A.

(57) ABSTRACT

A polycarbonate resin composition, according to the present invention, comprises: a polycarbonate resin; a polyester resin; and a metal compound, wherein the content ratio of the polycarbonate resin and polyester resin is from approximately 4:1 to approximately 9:1. The polycarbonate resin composition and a molded product using same have excellent physical properties, such as impact resistance, fluidity and the like, as well as excellent exterior and plating adhesion.

8 Claims, No Drawings

POLYCARBONATE RESIN COMPOSITION AND MOLDED PRODUCT USING SAME

CROSS-REFERENCE TO RELATED APPLICATIONS

This application claims priority to and the benefit of International Application No. PCT/KR2016/004443, filed Apr. 28, 2016, which published as WO 2016/175572 on Nov. 3, 2016; and Korean Patent Application No. 10-2015-0061403, filed in the Korean Intellectual Property Office on Apr. 30, 2015, the entire disclosure of each of which is incorporated herein by reference.

TECHNICAL FIELD

The present invention relates to a polycarbonate resin composition and a molded product using the same. More particularly, the present invention relates to a polycarbonate resin composition which exhibits good properties in terms of impact resistance, flowability, and the like while securing good properties in terms of external appearance and plating adhesion, and a molded product using the same.

BACKGROUND ART

A polycarbonate resin has lower specific gravity than glass or metal and has excellent formability and mechanical properties such as impact resistance. Glass or metal products have been rapidly replaced by plastic products using such a polycarbonate resin in the fields of electric/electronic products and automotive parts.

Recently, studies have been conducted into technology for forming desired fine patterns at a desired position by introducing a material capable of providing processability for direct coating or laser structuring to a polycarbonate resin or an alloy including the same, as an additive.

Particularly, an antenna of a smartphone needs a separate electrode for each frequency bandwidth. In order to realize fine patterns corresponding to frequency bands, laser direct structuring (LDS) technology using such an additive is widely used. This technology has an advantage in terms of internal design with the trend of reduction in smartphone thickness.

However, when such an additive is introduced into a polycarbonate resin, there is a problem in that the additive decomposes due to additional reaction with the polycarbonate resin, thereby causing significant deterioration in mechanical properties of the polycarbonate resin.

In order to secure good formability corresponding to the trend of thickness reduction, the polycarbonate resin is required to have good flowability.

In order to secure good flowability of the polycarbonate resin, there is a method of decreasing the molecular weight of the polycarbonate resin. However, decrease in molecular weight of the polycarbonate resin can cause brittleness of the polycarbonate resin, thereby providing a problem of low impact resistance.

Therefore, in order to overcome these problems, there is a need for a polycarbonate resin composition which can exhibit good properties in terms of impact resistance, external appearance, wettability and plating adhesion while improving formability by securing good flowability.

The background technique of the present invention is disclosed in Korean Patent Publication No. 2011-0018319 and the like.

DISCLOSURE

Technical Problem

It is one aspect of the present invention to provide a polycarbonate resin composition, which includes suitable amounts of metal compounds in a polycarbonate resin to permit easy formation of fine patterns through improvement in wettability and processability, and a molded product using the same.

It is another aspect of the present invention to provide a polycarbonate resin composition, which includes suitable amounts of a polycarbonate resin and a polyester resin so as to allow efficient control of glass transition temperature and thus can realize good formability allowing formation of a fine component by injection molding through improvement in flowability, and a molded product using the same.

It is a further aspect of the present invention to provide a polycarbonate resin composition, which includes suitable amounts of a polyester resin, a metal compound, and an olefin copolymer to improve wettability and plating adhesion while maintaining good flowability, and a molded product using the same.

Technical Solution

One aspect of the present invention relates to a polycarbonate resin composition. The polycarbonate resin composition includes: a polycarbonate resin; a polyester resin; and a metal compound, wherein the polycarbonate resin and the polyester resin are present in a weight ratio of about 4:1 to about 9:1.

In one embodiment, the polycarbonate resin composition may further include an olefin copolymer.

In one embodiment, the metal compound may be present in an amount of about 1 to about 15 parts by weight relative to about 100 parts by weight of the polycarbonate resin and the polyester resin.

In one embodiment, the polyester resin may include at least one of polyethylene terephthalate glycol (PETG), polybutylene terephthalate (PBT), and polytrimethylene terephthalate (PTT).

In one embodiment, the metal compound may include at least one of a metal oxide, a heavy metal complex oxide, and a copper salt.

In one embodiment, the metal oxide may include copper oxide, zinc oxide, tin oxide, magnesium oxide, aluminum oxide, gold oxide, silver oxide, or combinations thereof, and may have a spinel structure.

In one embodiment, the heavy metal complex oxide may be represented by Formula 1 and may have a spinel structure.

$$AB_2O_4 \qquad \text{[Formula 1]}$$

where A is cadmium, chromium, manganese, nickel, zinc, copper, cobalt, iron, magnesium, tin, or titanium; and B is chromium, iron, aluminum, nickel, manganese, molybdenum, antimony, bismuth, or tin.

In one embodiment, the copper salt may include at least one of copper hydroxide phosphate, copper phosphate, copper sulfate, and cuprous thiocyanate.

In one embodiment, the olefin copolymer may be present in an amount of about 1 to about 10 parts by weight relative to about 100 parts by weight of the polycarbonate resin and the polyester resin.

In one embodiment, the polycarbonate resin composition may have a glass transition temperature of about 110° C. to about 140° C.

In one embodiment, the polycarbonate resin composition may have a peel strength of about 1.35 N/mm or more (adhesive strength/coating linewidth), as measured on a plate-shaped injection-molded specimen using a tensile tester, in which the specimen has a size of about 1 mm×5 cm×5 cm (thickness×width×length) and is left for aging at room temperature for about 6 hours after injection molding and then subjected to surface activation in a stripe pattern using a laser, followed by Cu electroless plating to a thickness of about 35 μm.

In one embodiment, the polycarbonate resin composition may have an average falling height of about 50 cm to about 100 cm, as measured on a plate-shaped injection-molded specimen using a falling weight impact tester with a 500 g weight in accordance with the DuPont drop test method, in which the specimen has a size of about 1 mm×5 cm×5 cm (thickness×width×length) and is left for aging at room temperature for 6 hours after injection molding, and in which the average falling height is determined by impacting 20 specimens with the weight to measure a height of the weight at which about 50% of each specimen is broken, followed by averaging height values.

Another aspect of the present invention relates to a molded product including the polycarbonate resin composition as set forth above.

Advantageous Effects

The present invention provides a polycarbonate resin composition, which has suitable amounts of a metal compound in a polycarbonate resin to permit easy formation of fine patterns through improvement in wettability and processability, has suitable amounts of a polycarbonate resin and a polyester resin so as to allow efficient control of glass transition temperature and thus can realize good formability allowing formation of a fine component by injection molding through improvement in flowability, has suitable amounts of a polyester resin, a metal compound and an olefin copolymer to improve wettability and plating adhesion while maintaining good flowability, and can secure good external appearance through combination of suitable components including glass fibers while realizing good properties including impact resistance, and a molded product using the same.

BEST MODE

Hereinafter, embodiments of the present invention will be described in detail.

A polycarbonate resin composition according to the present invention can realize good physical properties, formability, wettability and plating adhesion, and may include: (A) a polycarbonate resin; (B) a polyester resin; and (C) a metal compound.

(A) Polycarbonate Resin

According to one embodiment of the present invention, the polycarbonate resin may be selected from any polycarbonate resins known in the art. For example, the polycarbonate resin may be an aromatic polycarbonate resin prepared by reacting diphenols represented by reacting phosgene, halogen formate, or carbonic diester with diphenols represented by Formula 2.

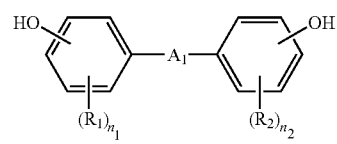

[Formula 2]

wherein $A_1$ is a single bond, a substituted or unsubstituted $C_1$ to $C_5$ alkylene group, a substituted or unsubstituted $C_1$ to $C_5$ alkylidene group, a substituted or unsubstituted $C_3$ to $C_6$ cycloalkylene group, a substituted or unsubstituted $C_5$ to $C_6$ cycloalkylidene group, CO, S, or $SO_2$; $R_1$ and $R_2$ are each independently a substituted or unsubstituted $C_1$ to $C_{30}$ alkyl group or a substituted or unsubstituted $C_6$ to $C_{30}$ aryl group; and $n_1$ and $n_2$ are each independently an integer from 0 to 4. Here, the term "substituted" means that a hydrogen atom in a functional group is substituted with a substituent selected from the group consisting of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, and combinations thereof.

Examples of the diphenols may include hydroquinone, resorcinol, 4,4'-dihydroxyphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like. For example, the diphenols may be 2,2-bis-(4-hydroxyphenyl)-propane, 2,2-bis-(3,5-dichloro-4-hydroxyphenyl)-propane, or 1,1-bis-(4-hydroxyphenyl)-cyclohexane. Specifically, the diphenols may be 2,2-bis-(4-hydroxyphenyl)-propane, which is also referred to as bisphenol A.

In some embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC), without being limited thereto.

In some embodiments, the polycarbonate resin may include a branched polycarbonate resin. For example, the polycarbonate resin may include a polycarbonate resin prepared by adding a tri- or higher polyfunctional compound, for example, a tri- or higher valent phenol group-containing compound in an amount of about 0.05 mole % to about 2 mole % based on the total amount of the diphenols.

In some embodiments, the polycarbonate resin may be a homopolycarbonate resin, a copolycarbonate resin, or a blend of a copolycarbonate resin and a homopolycarbonate resin.

(B) Polyester Resin

According to one embodiment of the invention, the polyester resin may be an aromatic polyester resin.

In some embodiments, the polyester resin may be prepared through polycondensation of an aromatic dicarboxylate as an acid component and a diol component. Examples of the aromatic dicarboxylate may include aromatic dicarboxylic acids such as terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalenedicarboxylic acid; and aromatic dicarboxylates such as dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, alkyl esters of naphthalene dicarboxylic acid, and mixtures thereof. Examples of the diol component may include a $C_2$ to $C_{12}$ diol, for example, ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,5-pentanediol, 1,6-hexanediol, and mixtures thereof.

In some embodiments, the aromatic polyester resin may include a polyethylene terephthalate resin, a polytrimethylene terephthalate resin, polybutylene terephthalate resin, a polyhexamethylene terephthalate resin, a polycyclohexane dimethylene terephthalate resin, and a polyester resin prepared through modification of a mixture of one of these resins and a monomer into a non-crystalline resin. For example, the aromatic polyester resin may include a polyethylene terephthalate glycol (PETG) resin, a polybutylene terephthalate (PBT) resin, a polytrimethylene terephthalate (PTT) resin, and combinations thereof. Specifically, the aromatic polyester resin may be a polyethylene terephthalate glycol (PETG) resin.

Here, the polyethylene terephthalate glycol resin refers to a linear resin prepared through polycondensation of terephthalic acid and ethylene glycol, and includes a polyethylene terephthalate homopolymer or a polyethylene terephthalate copolymer. The polyethylene terephthalate copolymer may be a non-crystalline polyethylene terephthalate copolymer containing 1,4-cyclohexane dimethanol (CHDM) as a copolymerization component, or may be a copolymer in which the ethylene glycol is partially replaced by 1,4-cyclohexane dimethanol.

In some embodiments, the polyester resin may have an inherent viscosity [11] of about 0.6 dl/g to about 1 dl/g, for example, about 0.7 dl/g to about 0.9 dl/g, as measured at 25° C. in an o-chlorophenol solvent. Within this range of viscosity, the polyester resin can improve mechanical strength and formability of the polycarbonate resin composition.

In some embodiments, the polycarbonate resin (A) and the polyester resin (B) may be present in a weight ratio ((A):(B)) of about 4:1 to about 9:1, for example, about 5:1 to about 7:1, specifically about 5:1 to about 6:1. Within this range, the polycarbonate resin composition can improve flowability by securing an optimal glass transition temperature while maintaining good physical properties.

(C) Metal Compound

According to one embodiment, the metal compound is a material that can be activated under stimulated emission light to provide wettability and processability to the polycarbonate resin composition and allows direct coating or laser structuring.

Herein, the term "stimulated emission light" refers to light amplified by stimulated emission. Stimulated emission light may be UV light at a wavelength of about 100 nm to about 400 nm, visible light at a wavelength of 400 nm to about 800 nm, or infrared light at a wavelength of about 800 nm to about 25,000 nm, for example, X-rays, gamma-rays, or particle beams (electron-beams, α-particle beams, or β-particle beams), specifically infrared light at a wavelength of about 1,064 nm.

In some embodiments, metal atoms included as nucleating agents in the metal compound placed on the surface of the polycarbonate resin composition can be activated when exposed to stimulated emission light. As a result, a region exposed to the stimulated emission light is activated by the metal atoms and can form a conductive structure.

In some embodiments, the metal compound may include a metal oxide, a heavy metal complex oxide, a copper salt, or a combination thereof. In addition, these compounds may have a spinel structure.

The metal oxide may include at least one selected from the group consisting of copper oxide, zinc oxide, tin oxide, magnesium oxide, aluminum oxide, gold oxide, silver oxide, and mixtures thereof.

The heavy metal complex oxide may be represented by Formula 1.

$$AB_2O_4 \qquad \text{[Formula 1]}$$

where A is cadmium, chromium, manganese, nickel, zinc, copper, cobalt, iron, magnesium, tin, or titanium; and B is chromium, iron, aluminum, nickel, manganese, molybdenum, antimony, bismuth, or tin.

In the heavy metal complex oxide represented by Formula 1, A provides a monovalent cation component of a metal oxide cluster and B provides a monovalent cation component of a metal cation cluster. The metal oxide cluster including A may have a tetrahedral structure and the metal oxide cluster including B may have an octahedral structure.

In addition, the heavy metal complex oxide represented by Formula 1 may have a structure in which oxygen atoms are arranged in a cubic close-packed lattice, and B and A occupy octahedral and tetrahedral sites in the lattice, respectively.

Examples of the heavy metal complex oxide may include magnesium aluminum oxide ($MgAl_2O_4$), zinc aluminum oxide ($ZnAl_2O_4$), iron aluminum oxide ($FeAl_2O_4$), copper iron oxide ($CuFe_2O_4$), copper chromium oxide ($CuCr_2O_4$), manganese iron oxide ($MnFe_2O_4$), nickel iron oxide ($NiFe_2O_4$), titanium iron oxide ($TiFe_2O_4$), iron chromium oxide ($FeCr_2O_4$), magnesium chromium oxide ($MgCr_2O_4$), and combinations thereof. For example, the heavy metal complex oxide may be copper chromium oxide ($CuCr_2O_4$). Copper chromium oxide ($CuCr_2O_4$) has a dark color and thus is advantageous when a final molded product is required to be black or grey.

Examples of the copper salt may include copper hydroxide phosphate, copper phosphate, copper sulfate, cuprous thiocyanate, and combinations thereof. For example, the copper salt may be copper hydroxide phosphate. Copper hydroxide phosphate is a compound in which copper phosphate is combined with copper hydroxide, and may include $Cu_3(PO_4)_2 \cdot 2Cu(OH)_2$, $Cu_3(PO_4)_2 \cdot Cu(OH)_2$, and the like. Copper hydroxide phosphate does not affect color-reproduction properties of a colorant, as an additive, and thus allows a molded product having desired color to be easily obtained.

In some embodiments, the metal compound may have an average particle diameter of about 0.01 µm to about 50 µm, for example, about 0.1 µm to about 30 µm, specifically about 0.5 µm to about 10 µm. Within this range, it is possible to form a uniform coating surface in direct coating or laser structuring.

As used herein, unless otherwise stated, the term "average particle diameter" refers to D50 (a diameter at a distribution rate of 50%) which is a number average particle diameter.

In some embodiments, the metal compound may have a form in which a material such as mica, talc, or titanium oxide is coated onto or otherwise bonded to a metal oxide, a heavy metal complex oxide, or a copper salt. Here, mica, talc, or titanium oxide may be coated onto or bonded to the surface of the metal oxide in an amount of about 10 parts by weight to about 40 parts by weight relative to about 100 parts by weight of the metal compound.

In some embodiments, the metal compound may be present in an amount of about 1 to about 15 parts by weight, for example, about 5 parts by weight to about 10 parts by weight, relative to about 100 parts by weight of the polycarbonate resin and the polyester resin ((A)+(B)). Within this range, the polycarbonate resin composition can exhibit good properties in terms of wettability, plating adhesion, and impact resistance.

The polycarbonate resin composition containing the metal compound (C) can realize a desired circuit pattern through direct laser structuring of the polycarbonate resin, and can reduce the number of processes by eliminating the use of chemicals, which are typically used in electrical plating.

According to one embodiment, the polycarbonate resin composition may further include (D) an olefin copolymer in order to improve flowability.

In some embodiments, the olefin copolymer may be a graft copolymer (modified olefin copolymer) having a polyolefin copolymer or polyolefin backbone with a functional group grafted thereto. For example, the modified olefin copolymer may be prepared by grafting at least one functional group of a (meth)acrylate group, a modified ester group, an arylate group, an acrylonitrile group and combinations thereof to the polyolefin backbone. Specifically, the modified olefin copolymer may be prepared by grafting a methyl acrylate group to a polyethylene backbone.

In some embodiments, the polyolefin backbone may include polyethylene, polypropylene, or an ethylene-propylene copolymer, and may be present in an amount of about 50 wt % to about 100 wt %, for example, about 50 wt % to 95 wt %, specifically about 60 wt % to about 95 wt %, based on the total amount of the olefin copolymer.

It is desirable that the functional group be partially compatible with the polycarbonate resin. For example, the functional group may include an acrylate group such as methyl acrylate, ethyl acrylate and butyl acrylate, a modified ester group such as ethylene glycol, an arylate group, and an acrylonitrile group. The functional group may be present in an amount of about 5 to about 50 wt %, for example, about 5 to about 40 wt %, based on the total amount of the olefin copolymer. Within this range, the polycarbonate resin composition can exhibit good properties in terms of impact strength, flowability, and the like.

In some embodiments, the olefin copolymer may be present in an amount of about 1 to about 10 parts by weight, for example, about 2 to about 5 parts by weight, specifically about 2.5 to about 3.5 parts by weight, relative to about 100 parts by weight of the polycarbonate resin and the polyester resin ((A)+(B)). Within this range, the polycarbonate resin composition can exhibit further improved properties in terms of flowability, mechanical properties, and the like.

According to one embodiment, the polycarbonate resin composition may further include glass fibers, as needed. The glass fibers can serve to improve external appearance and rigidity of the polycarbonate resin composition while improving plating adhesion thereof.

The glass fibers may include typical glass fibers. For example, the glass fibers may have a diameter of about 5 μm to about 20 μm, for example, about 8 μm to about 15 μm, and a length of about 1.5 mm to about 8 mm, for example, about 2 mm to about 5 mm. Within this range of diameter, the glass fibers can secure improvement in external appearance and rigidity of the polycarbonate resin composition, and within this range of length of the glass fibers, the thermoplastic resin composition can be easily introduced into a forming extruder, thereby enhancing productivity.

The glass fibers may have an average ratio of diameter to length of about 1:75 to about 1:1,600, specifically about 1:200 to about 1:500. Within this range, the glass fibers can maximize the effects of improving external appearance and rigidity of the polycarbonate resin composition while improving productivity thereof. Here, the average ratio of diameter to length of the glass fibers refers to a value obtained by averaging ratios of diameter to length of all of the glass fibers.

In some embodiments, the glass fibers may have a cross-sectional shape selected from the group consisting of a circular shape, an elliptical shape, a rectangular shape, and a dumbbell shape having two circles connected to each other. Specifically, the glass fibers may have a cross-sectional shape selected from the group consisting of a circular shape, an elliptical shape, or a combination thereof.

In some embodiments, the glass fibers may be subjected to surface treatment with a specific glass fiber treatment agent so as to prevent reaction with the polycarbonate resin while improving the degree of impregnation. Surface treatment may be performed in fabrication of the glass fibers or in post-processing. Examples of the glass fiber treatment agent may include a lubricant, a coupling agent, a surfactant, and the like. The lubricant is used to form strands having a constant diameter or thickness in fabrication of the glass fibers, and the coupling agent is used to provide good adhesion between the glass fibers and the resin. When such a glass fiber treatment agent is properly selected depending upon kinds of the resin and glass fibers, it is possible to impart good properties to a glass fiber-reinforced material.

In some embodiments, the glass fibers may have a cross-sectional aspect ratio of less than about 8, for example, less than about 4, specifically from about 1 to about 1.5. Here, the cross-sectional aspect ratio of the glass fibers refers to a value obtained by averaging the ratios of diameter of the longest axis to diameter of the shortest axis of all of the glass fibers.

In some embodiments, glass fibers having a circular cross-section and glass fibers having an elliptical cross-shape may be mixed in a weight ratio of about 1:4 to about 4:2, for example, about 1:2 to about 2:1. Within this range of weight ratio, the glass fibers can improve dimensional stability of the thermoplastic resin composition.

In some embodiments, the glass fibers may be present in an amount of about 5 parts by weight to about 100 parts by weight, for example, about 20 parts by weight to about 50 parts by weight, specifically about 30 parts by weight to about 40 parts by weight, relative to about 100 parts by weight of the polycarbonate resin and the polyester resin ((A)+(B)). Within this range, the glass fibers can improve external appearance and rigidity of the polycarbonate resin composition.

According to one embodiment, the polycarbonate resin composition may have a glass transition temperature of about 110° C. to about 140° C., for example, about 115° C. to about 130° C., specifically about 118° C. to about 125° C. Within this range, the polycarbonate resin composition can exhibit good properties in terms of wettability, flowability, processability, and the like.

In some embodiments, the polycarbonate resin composition may have a peel strength of about 1.35 N/mm or more (adhesive strength/coating linewidth), for example, about 1.40 N/mm to about 3.00 N/mm, specifically about 1.45 N/mm to about 1.52 N/mm, as measured on a plate-shaped injection-molded specimen using a tensile tester, in which the specimen has a size of about 1 mm×5 cm×5 cm (thickness×width×length) and is left for aging at room temperature for about 6 hours after injection molding and then subjected to surface activation in a stripe pattern using a laser, followed by Cu electroless plating to a thickness of about 35

In some embodiments, the polycarbonate resin composition may have a flow length of about 100 mm to about 300 mm, for example, about 150 mm to about 250 mm, specifically about 163 mm to about 170 mm, as measured on a specimen, which is prepared by injection molding at about 310° C. using a spiral mold having a thickness of 1 mm and a width of about 1 cm under a constant injection pressure, a constant injection speed, and a constant cushion amount.

In some embodiments, the polycarbonate resin composition may have an average falling height of about 50 cm to about 100 cm, for example, about 60 cm to about 80 cm, specifically about 65 cm to about 73 cm, as measured on a plate-shaped injection-molded specimen using a falling weight impact tester with a 500 g weight in accordance with the DuPont drop test method, in which the specimen has a size of about 1 mm×5 cm×5 cm (thickness×width×length) and is left for aging at room temperature for 6 hours after injection molding, and in which the average falling height is determined by impacting 20 specimens with the weight to measure a height of the weight at which about 50% of each specimen is broken, followed by averaging height values.

Through repeated testing, it could be confirmed that the numerical limitations as described above have critical significance in that the polycarbonate resin composition according to the present invention had excellent mechanical properties and processability while exhibiting improved wettability and plating adhesion, thereby efficiently realizing metal microcircuits.

In accordance with another aspect of the present invention, a molded product including the polycarbonate resin composition is provided. For example, the polycarbonate resin composition may be applied to various industrial fields including electrical/electronic components, automobile components, and the like.

MODE FOR INVENTION

Next, the present invention will be described in more detail with reference to some examples. It should be understood that these examples are provided for illustration only and are not to be construed in any way as limiting the present invention.

Example

Details of a polycarbonate resin (A), a polyester resin (B), a metal compound (C) and an olefin copolymer (D) used in Examples and Comparative Examples are as follows.

(A) Polycarbonate resin

A polycarbonate resin (SC-1190, Samsung SDI Co., Ltd.) was used.

(B) Polyester resin (B-1) Polyethylene terephthalate glycol (PETG)

Polyethylene terephthalate glycol (PETG) (SKYGREEN PETG 52008, SK Chemical Co., Ltd.) was used.

(B-2) Polybutylene terephthalate (PBT)

Polybutylene terephthalate (PBT) (SHINITE K001, SHINKONG Co., Ltd.) was used.

(B-3) Polytrimethylene terephthalate (PTT)

Polytrimethylene terephthalate (PTT) (SORONA MT3401, DUPONT Co., Ltd.) was used.

(C) Metal compound

Copper chromium oxide (Black 1G, SHEPHERD Co., Ltd.) was used.

(D) Olefin copolymer

Ethylene (DuPont)/methyl acrylate copolymer (AC1330, Elvaroy Co., Ltd.) was used.

Examples 1 to 4 and Comparative Examples 1 to 6

The components were provided in amounts as listed in Table 1 and dry-mixed, followed by extrusion at a nozzle temperature of 250° C. to 280° C. using a twin-screw extruder (ϕ=45 mm), thereby preparing pellets. The prepared pellets were dried at 100° C. for 3 hours or more, thereby preparing a specimen.

TABLE 1

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| (A) Polycarbonate | 85 | 85 | 85 | 85 | 100 | 60 | 60 | 60 | 85 | 85 |
| (B-1) PETG | 15 | — | — | 15 | — | 40 | — | — | 15 | 15 |
| (B-2) PBT | — | 15 | — | — | — | — | 40 | — | — | — |
| (B-3) PTT | — | — | 15 | — | — | — | — | 40 | — | — |
| (C) Metal compound | 10 | 10 | 10 | 5 | 10 | 10 | 10 | 10 | 0.5 | 20 |
| (D) Olefin copolymer | 3 | 3 | 3 | 3 | 3 | 3 | 3 | 3 | 3 | 3 |

In Table 1, the amounts of the polycarbonate resin (A) and the polyester resin (B) are listed in wt % and the amounts of the metal compound (C) and the olefin copolymer (D) are listed in parts by weight relative to 100 parts by weight of the polycarbonate resin (A) and the polyester resin (B). Each of the specimens prepared in Examples and Comparative examples was evaluated as to plating adhesion, impact resistance, flowability and glass transition temperature. Evaluation results are shown in Table 2.

Property Evaluation (1) Plating adhesion (N/mm): A plate-shaped specimen having a size of about 1 mm×5 cm×5 cm (thickness×width× length) was prepared by injection molding, left for aging at room temperature for about 6 hours, and then subjected to surface activation in a stripe pattern using a laser, followed by Cu electroless plating to a thickness of about 35 μm. Then, peel strength was measured in N/mm (adhesive strength/coating linewidth) using a tensile tester.

(2) Impact resistance (cm): A specimen having a size of about 1 mm×5 cm×5 cm (thickness×width×length) was prepared by injection molding and left for aging at room temperature for 6 hours. Then, an average falling height was measured using a falling weight impact tester with a 500 g weight in accordance with the DuPont drop test method. Here, the average falling height was determined by impacting 20 specimens with the weight to measure a height of the weight at which about 50% of each specimen is broken, followed by averaging height values.

(3) Flow length (mm): Flow length was measured on a specimen prepared by injection molding at about 310° C. using a spiral mold having a thickness of 1 mm and a width of about 1 cm under a constant injection pressure and a constant injection speed.

(4) Glass transition temperature (Tg, ° C.): Glass transition temperature was measured using DSC equipment (Q100, TA Instrument Inc.) while heating at a heating rate of 10° C./min.

TABLE 2

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Plating adhesion (N/mm) | 1.43 | 1.45 | 1.50 | 1.52 | 1.31 | 1.77 | 1.76 | 1.72 | Plating failed | 1.21 |
| Impact resistance (cm) | 67 | 65 | 71 | 70 | 79 | 33 | 42 | 38 | 65 | 51 |
| Flow length (mm) | 164 | 175 | 171 | 169 | 127 | 244 | 223 | 254 | 176 | 160 |
| Glass transition temperature (Tg, ° C.) | 128 | 127 | 130 | 128 | 145 | 98 | 99 | 105 | 129 | 127 |

As shown in Table 2, it could be seen that the polycarbonate resin compositions of Examples 1 to 4 exhibited better properties in terms of flowability, impact resistance, and plating adhesion than the polycarbonate resin compositions of Comparative Examples 1 to 6 and thus were suited for an external material for portable electronic devices.

Specifically, as compared with the polycarbonate resin compositions of Examples 1 to 4, which were prepared by mixing the polycarbonate resin (A) and the polyester resin (B) in an optimal ratio, the polycarbonate resin composition of Comparative Example 1, which was prepared without using the polyester resin (B), suffered from significant deterioration in flowability and exhibited low plating adhesion and high glass transition temperature, thereby providing difficulty in processing.

In addition, as compared with the polycarbonate resin compositions of Examples 1 to 3, the polycarbonate resin compositions of Comparative Examples 2 to 4 including the polycarbonate resin (A) and the polyester resin (B) in an undesirable weight ratio suffered from significant deterioration in impact resistance and had a low glass transition temperature, causing retardation of solidification and thus extending a cycle time upon injection molding, and thus could not be used as an external material for portable electronic devices.

Further, the polycarbonate resin composition of Comparative Example 5 including a smaller amount of the metal compound (C) than the polycarbonate resin composition according to the present invention did not allow plating, and the polycarbonate resin composition of Comparative Example 6 including an excess of the metal compound (C) allowed plating but could not be applicable to an external material for portable electronic devices due to significant deterioration in plating adhesion and impact resistance.

As such, through repeated testing, critical significance of the combination and content ratio of the components of the polycarbonate resin composition according to the present invention was proven by securing significant improvement in wettability, plating adhesion, impact resistance and flowability.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The invention claimed is:

1. A polycarbonate resin composition comprising:
a polycarbonate resin;
a polyester resin comprising polyethylene terephthalate glycol (PETG), polybutylene terephthalate (PBT), and/or polytrimethylene terephthalate (PTT);
an olefin copolymer; and
a metal compound comprising a heavy metal complex oxide represented by Formula 1 and having a spinel structure:

$$AB_2O_4, \qquad \text{[Formula 1]}$$

wherein A is cadmium, chromium, manganese, nickel, zinc, copper, cobalt, iron, magnesium, tin, or titanium; and B is chromium, iron, aluminum, nickel, manganese, molybdenum, antimony, bismuth, or tin in an amount of about 1 to about 15 parts by weight relative to about 100 parts by weight of the polycarbonate resin and the polyester resin, wherein the polycarbonate resin and the polyester resin are present in a weight ratio of about 5:1 to about 9:1.

2. The polycarbonate resin composition according to claim 1, wherein the olefin copolymer is present in an amount of about 1 to about 10 parts by weight relative to about 100 parts by weight of the polycarbonate resin and the polyester resin.

3. The polycarbonate resin composition according to claim 1, wherein the polycarbonate resin composition has a glass transition temperature of about 110° C. to about 140° C.

4. The polycarbonate resin composition according to claim 1, wherein the polycarbonate resin composition has a peel strength of about 1.35 N/mm or more in terms of adhesive strength/coating linewidth, as measured on a plate-shaped injection-molded specimen using a tensile tester, in which the specimen has a size of about 1 mm thick ×5 cm wide ×5 cm long and is left for aging at room temperature for about 6 hours after injection molding and then subjected to surface activation in a stripe pattern using a laser, followed by Cu electroless plating to a thickness of about 35 μm.

5. The polycarbonate resin composition according to claim 1, wherein the polycarbonate resin composition has an average falling height of about 50 cm to about 100 cm, as measured on a plate-shaped injection-molded specimen using a falling weight impact tester with a 500 g weight in accordance with the DuPont drop test method, in which the specimen has a size of about 1 mm thick ×5 cm wide ×5 cm long and is left for aging at room temperature for 6 hours after injection molding, and in which the average falling height is determined by impacting 20 specimens with the weight to measure a height of the weight at which about 50% of each specimen is broken, followed by averaging height values.

6. A molded product formed from the polycarbonate resin composition according to claim 1.

7. The polycarbonate resin composition according to claim 1, wherein the polycarbonate resin composition has a peel strength of about 1.35 N/mm or more in terms of adhesive strength/coating linewidth, as measured on a plate-shaped injection-molded specimen using a tensile tester, in which the specimen has a size of about 1 mm thick ×5 cm wide ×5 cm long and is left for aging at room temperature for about 6 hours after injection molding and then subjected to surface activation in a stripe pattern using a laser, followed by Cu electroless plating to a thickness of about 35 µm; and an average falling height of about 50 cm to about 100 cm, as measured on a plate-shaped injection-molded specimen using a falling weight impact tester with a 500 g weight in accordance with the DuPont drop test method, in which the specimen has a size of about 1 mm thick ×5 cm wide ×5 cm long and is left for aging at room temperature for 6 hours after injection molding, and in which the average falling height is determined by impacting 20 specimens with the weight to measure a height of the weight at which about 50% of each specimen is broken, followed by averaging height values.

8. The polycarbonate resin composition according to claim 7, wherein the polycarbonate resin composition has a peel strength of about 1.40 N/mm to about 3.00 N/mm in terms of adhesive strength/coating linewidth, as measured on a plate-shaped injection-molded specimen using a tensile tester, in which the specimen has a size of about 1 mm thick ×5 cm wide ×5 cm long and is left for aging at room temperature for about 6 hours after injection molding and then subjected to surface activation in a stripe pattern using a laser, followed by Cu electroless plating to a thickness of about 35 µm; and an average falling height of about 60 cm to about 80 cm, as measured on a plate-shaped injection-molded specimen using a falling weight impact tester with a 500 g weight in accordance with the DuPont drop test method, in which the specimen has a size of about 1 mm thick ×5 cm wide ×5 cm long and is left for aging at room temperature for 6 hours after injection molding, and in which the average falling height is determined by impacting 20 specimens with the weight to measure a height of the weight at which about 50% of each specimen is broken, followed by averaging height values.

\* \* \* \* \*